(12) United States Patent
Walsh et al.

(10) Patent No.: US 12,124,561 B2
(45) Date of Patent: Oct. 22, 2024

(54) EMBEDDING SECURITY REQUIREMENTS IN CONTAINER IMAGES

(71) Applicant: Red Hat, Inc., Raleigh, NC (US)

(72) Inventors: Daniel Walsh, Westford, MA (US); Valentin Rothberg, Grasbrunn (DE)

(73) Assignee: Red Hat, Inc., Raleigh, NC (US)

( * ) Notice: Subject to any disclaimer, the term of this patent is extended or adjusted under 35 U.S.C. 154(b) by 517 days.

(21) Appl. No.: 17/079,194

(22) Filed: Oct. 23, 2020

(65) Prior Publication Data
US 2022/0129539 A1 Apr. 28, 2022

(51) Int. Cl.
*G06F 21/00* (2013.01)
*G06F 21/51* (2013.01)
*G06F 21/54* (2013.01)

(52) U.S. Cl.
CPC .............. *G06F 21/51* (2013.01); *G06F 21/54* (2013.01); *G06F 2221/033* (2013.01)

(58) Field of Classification Search
CPC ..... G06F 2221/033; G06F 21/54; G06F 21/51
USPC .......................................................... 726/1
See application file for complete search history.

(56) References Cited

U.S. PATENT DOCUMENTS

| | | | |
|---|---|---|---|
| 6,574,736 B1* | 6/2003 | Andrews | G06F 9/468 709/227 |
| 10,255,054 B2 | 4/2019 | Iyer et al. | |
| 10,326,803 B1* | 6/2019 | Haney | H04L 63/30 |
| 10,565,092 B2 | 2/2020 | Benes et al. | |
| 11,550,903 B1* | 1/2023 | Epstein | G06F 21/57 |
| 2010/0017857 A1* | 1/2010 | Kramer | G06F 21/52 726/4 |
| 2010/0100744 A1* | 4/2010 | Dutta | H04L 9/3236 713/176 |

(Continued)

FOREIGN PATENT DOCUMENTS

| | | | | |
|---|---|---|---|---|
| AU | 2014318585 A1 * | 3/2016 | ........... | G01N 21/274 |
| KR | 20200107538 | * 9/2020 | ............ | G06F 9/455 |

OTHER PUBLICATIONS

Burillo, "Kubernetes security context, security policy, and network policy—Kubernetes security guide (Part 2)", Sysdig, https://sysdig.com/blog/kubernetes-security-psp-network-policy/, May 10, 2023.

(Continued)

*Primary Examiner* — Josnel Jeudy
(74) *Attorney, Agent, or Firm* — Womble Bond Dickinson (US) LLP

(57) ABSTRACT

Embodiments of the present disclosure relate to specifying security settings for containers and extracting and applying such security settings from container images provided by e.g., developers or vendors of an application. More specifically, a developer of an application may determine a minimum level of security that is necessary for the application to operate and generate custom security settings based on the determined minimum level of security. The custom security settings may be embedded into a container image corresponding to the application. A user of the application may retrieve the container image and extract the custom security settings and compare them to default security settings. In response to determining that the custom security settings are a subset of the default security settings, the custom security settings may be applied to a container that is run based on the container image.

20 Claims, 9 Drawing Sheets

(56) References Cited

U.S. PATENT DOCUMENTS

| | | | |
|---|---|---|---|
| 2013/0232540 A1* | 9/2013 | Saidi | H04L 63/10 |
| | | | 726/1 |
| 2017/0153930 A1* | 6/2017 | Philips | G06F 9/45558 |
| 2017/0295197 A1* | 10/2017 | Parimi | H04L 63/10 |
| 2018/0239602 A1* | 8/2018 | Dayan | G06F 9/44505 |
| 2020/0026859 A1* | 1/2020 | Sun | G06F 11/3466 |
| 2020/0104238 A1* | 4/2020 | Radu | G06F 11/0751 |
| 2020/0334362 A1* | 10/2020 | Stoler | G06F 21/577 |
| 2023/0074580 A1* | 3/2023 | Neugschwandtner | G06F 21/54 |
| 2024/0080342 A1* | 3/2024 | Mishra Gupta | H04L 63/20 |

OTHER PUBLICATIONS

"Docker Security", Docker, 2020, https://docs.docker.com/engine/security/security/.

* cited by examiner

EMBEDDING SECURITY REQUIREMENTS IN CONTAINER IMAGES

TECHNICAL FIELD

Aspects of the present disclosure relate to containers, and more particularly, to applying custom security settings to containers.

BACKGROUND

Containers are active components executing on an operating system that provide an environment for applications to run, while being isolated from any other components of a host machine, network, or data center etc. Multiple containers may execute on a single operating system kernel and share the resources of the hardware the operating system is running on. All of the files, libraries and dependencies necessary to run applications in a container may be provided by an image file(s). An image file may be comprised of a set of base layers that define the runtime environment, as well as the packages and utilities necessary for a containerized application to run. A container may include the base layers from an image file as well as an in-memory layer in which the containerized application may write/modify data.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Currently, all users of containers run their containers with a similar level of security which often corresponds to the least common denominator of security. Because container engines need to run many different workloads, the security settings must be set such that all the different workloads will run. There are three ways in which security settings can be specified. First, human users and orchestrators can specify (e.g., via a command line input) description modifications for security settings that a container will run with, however most users run with a default or a lower level of security. Second, container engines may hard code the security settings they will run containers with, however container engines tend to utilize a universal level of security since the security settings cannot be too strict (as general containers will fail) but also cannot be too lose (because containers cannot run securely).

The final way rests with developers, or vendors of applications, who generate container images for an application and have specialized knowledge of how the application runs and of the minimal security requirements that a container executing the application will run with. Because users of an application cannot be relied on to ensure appropriate security settings, and container engines must be general purpose to allow as many applications as possible to run, security of an application must often depend on a developer or vendor.

The present disclosure addresses the above-noted and other deficiencies by using a processing device to determine a minimum level of security that is necessary for an application to operate and generate custom security settings based on the determined minimum level of security. The custom security settings may be determined by a developer of the application who may have the best knowledge of the minimum level of security required to run the application, and may embedded into a container image corresponding to the application. The custom security settings may be embedded into the image metadata of the container image. The container image may be uploaded to e.g., a registry server, where a user of the application may retrieve the container image and extract the custom security settings and compare them to default security settings. In response to determining that the custom security settings are a subset of the default security settings, the user may determine that the custom security settings are stricter than the default security settings and may execute a container based on the container image and apply the custom security settings.

Figure 1:
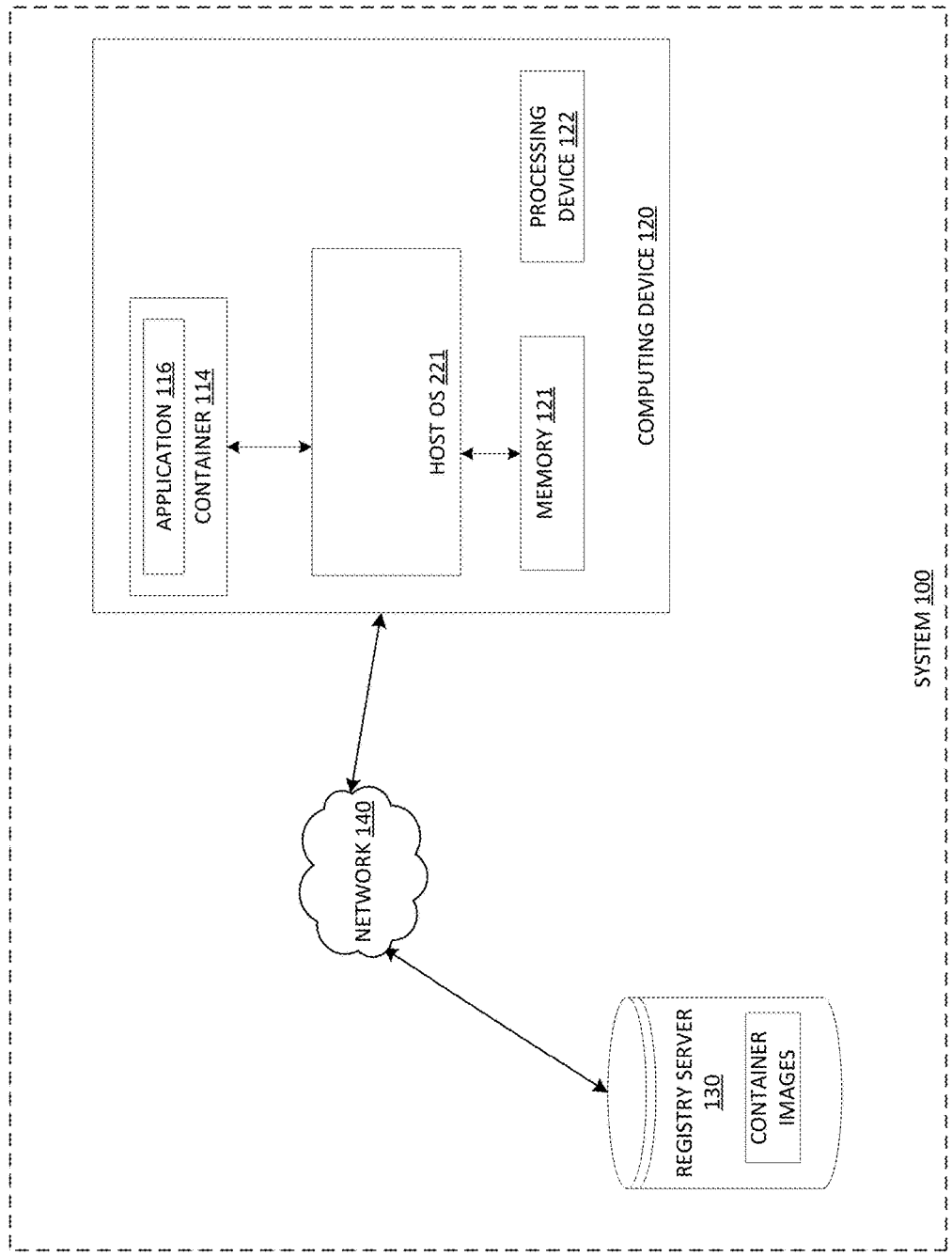
FIG. 1 is a block diagram that illustrates an example system, in accordance with some embodiments of the present disclosure.

FIG. 1 is a block diagram that illustrates an example system 100. As illustrated in FIG. 1, the system 100 includes a computing device 120, a registry server 130 and a network 140. The computing device 120 and the registry server 130 may be coupled to each other (e.g., may be operatively coupled, communicatively coupled, may communicate data/messages with each other) via network 140. Network 140 may be a public network (e.g., the internet), a private network (e.g., a local area network (LAN) or wide area network (WAN)), or a combination thereof. In one embodiment, network 140 may include a wired or a wireless infrastructure, which may be provided by one or more wireless communications systems, such as a WiFi™ hotspot connected with the network 140 and/or a wireless carrier system that can be implemented using various data processing equipment, communication towers (e.g. cell towers), etc. The network 140 may carry communications (e.g., data, message, packets, frames, etc.) between computing device 120 and registry server 130. The computing device 120 (and registry server 130) may include hardware such as processing device 122 (e.g., processors, central processing units (CPUs)), memory 121 (e.g., random access memory (RAM), storage devices (e.g., hard-disk drive (HDD)), and solid-state drives (SSD), etc.), and other hardware devices (e.g., sound card, video card, etc.). A storage device may comprise a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices.

FIG. 1 and the other figures may use like reference numerals to identify like elements. A letter after a reference numeral, such as "110A," indicates that the text refers specifically to the element having that particular reference numeral. A reference numeral in the text without a following letter, such as "110," refers to any or all of the elements in the figures bearing that reference numeral.

The computing device 120 and registry server 130 may comprise any suitable type of computing device or machine that has a programmable processor including, for example, server computers, desktop computers, laptop computers, tablet computers, smartphones, set-top boxes, etc. In some examples, the computing device 120 and registry server 130 may comprise a single machine or may include multiple interconnected machines (e.g., multiple servers configured in a cluster). The computing device 120 and registry server 130 may be implemented by a common entity/organization or may be implemented by different entities/organizations. For example, computing device 120 may be operated by a first company/corporation and registry server 130 may be operated by a second company/corporation. The computing device 120 and registry server 130 may each execute or include an operating system (OS), as discussed in more detail below. The OSs of computing device 120 and registry server 130 may manage the execution of other components (e.g., software, applications, etc.) and/or may manage access to the hardware (e.g., processors, memory, storage devices etc.) of the computing device.

As illustrated in FIG. 1, computing device 120 may run a container 114. In some embodiments, the container 114 may execute on a container engine (shown in FIG. 2A) which executes on top of the host OS 221 of computing device 120, as discussed in more detail below. The container engine may allow different containers to share the host OS 221 (e.g., the OS kernel, packages, binaries, libraries thereof etc.), and may also perform other functions as discussed in more detail below. The container 114 may be isolated, in that it is not connected to any other device or component of system 100, whether virtual or otherwise. Container 114 may execute application 116. Registry server 130 may be a server which may store image files (e.g., docker images), as discussed in further detail herein. Although FIG. 1 illustrates only a single computing device 120 for ease of illustration and description, computing device 120 may be just one deployment among many within an overarching cloud or on-premises infrastructure that system 100 represents. For example, additional computing devices may be included within system 100 that act as additional deployments.

Figure 2B:
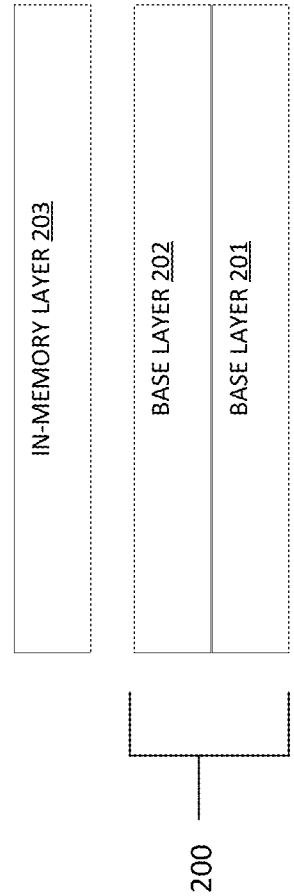
FIG. 2B is a block diagram that illustrates an image file and the in-memory layer of a container, in accordance with some embodiments of the present disclosure.
Figure 2A:
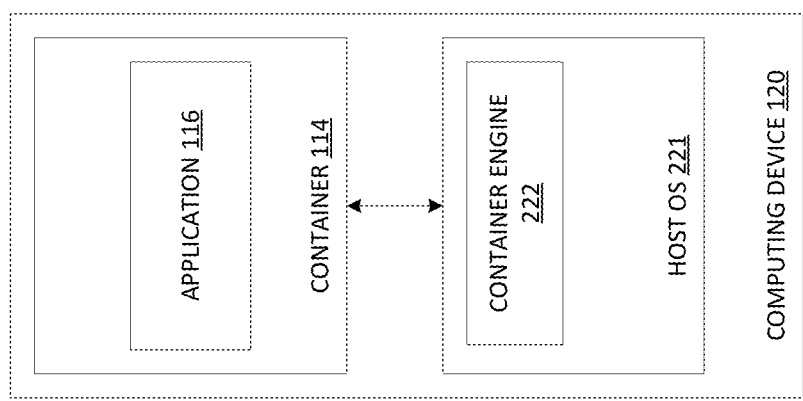
FIG. 2A is a block diagram that illustrates an example container executing within a computing device, in accordance with some embodiments of the present disclosure.

FIG. 2A is a block diagram that illustrates the container 114 of FIG. 1 executing within computing device 120, in accordance with some embodiments of the present disclosure. In one embodiment, the container 114 may be an isolated set of resources allocated to executing an application, software, and/or process independent from other applications, software, and/or processes. The host OS 221 may use namespaces to isolate the resources of containers from each other. In another embodiment, the container 114 may be a virtualized object similar to a virtual machine. However, container 114 may not implement a separate guest OS. The container 114 may share the OS kernel and packages (e.g., libraries, binary files and source files) of the host OS 221 with other containers (not shown) that are executing on the computing device 120. Although FIG. 2A illustrates one container 114, the computing device 120 may include multiple containers in other embodiments. Each container may have one or more respective file systems, memories, devices, network ports, etc., for accessing the physical resources of the computing device 120 (e.g., processing device 122 and memory 121, shown in FIG. 1).

In some embodiments, the container engine 222 may allow different containers to share the host OS 221 (including e.g., the OS kernel as well as packages including any associated libraries, binary and/or source files etc.) of the computing device 120. For example, the container engine 222 may multiplex the packages of the host OS 221 between multiple containers. The container engine 222 may also facilitate interactions between the container 114 and the resources of the computing device 120. For example, the container engine 222 may manage requests from container 114 to access a memory (e.g., a RAM) of the computing device 120. In another example, the container engine 222 may manage requests from the container 114 to access certain packages of the host OS 221. The container engine 222 may also create, remove, and manage containers. In one embodiment, the container engine 222 may be a component of the host operating system 221 (e.g., Red Hat™ Enterprise Linux). In another embodiment, container engine 222 may run on top of the host operating system 221, or may run directly on host hardware without the use of a host operating system 221. In yet other embodiments, container engine 222 may be a component of a network virtualization platform (not shown), such as the RedHat™ OpenStack™ platform for example, that runs on host OS 211. Container engine 222 may include software or logic to build a container using a container image such as a docker file.

As illustrated in FIG. 2A, application 116 may execute within the container 114. For example, the application 116 may execute within a runtime environment (not shown in the figures) of the container 114. Both the container 114 and the application 116 may be created by the host OS 221 (e.g., via container engine 222). The host OS 221, via the computing device 120 may provide administrators and users with the capability to configure and deploy a variety of applications and/or network functions within containers.

Container engine 222 may provide an image-based deployment module for creating containers and may store one or more image files (referred to herein as "container images") for creating container instances. In some embodiments, the container images may be stored in registry server 130 (e.g., after being generated by a developer or vendor). Each container image may include a series of layers, which may be combined into a single image as discussed in further detail herein.

Container engine 222 may include a storage driver (not shown), such as OverlayFS, to manage the contents of a container including the read only (e.g., base) and writable (e.g. in-memory) layers of the container. The storage driver may be a type of union file system which allows a developer to overlay one layer on top of another. Changes (e.g., data to be written) may be recorded in the upper-most layer (e.g., the in-memory layer), while the lower layer(s) (e.g., base images) remain unmodified. In this way, multiple containers may share an image file that includes base layers that are read-only.

FIG. 2B illustrates an example container image 200 that the container 114 may be generated from. The container image 200 may be stored by the container engine 222 illustrated in FIG. 2A or registry server 130 illustrated in FIG. 1. In some embodiments, as illustrated in FIG. 2B, image file 200 may include base layers 201 and 202. Container image 200 may be shared by multiple containers. When the container engine 222 creates a new container, it may add a new writable (e.g., in-memory) layer on top of the underlying base layers. This new writable layer is illustrated as the in-memory layer 203 in FIG. 2B. When the container is deleted, the in-memory layer 203 is also deleted. However, the underlying container image 200 remains unchanged. Although illustrated as having two base layers for simplicity, container image 200 may include any suitable number of base layers. Base layers may define the runtime environment as well as the packages and utilities necessary for a containerized application to run. In the example of FIG. 2B, base layer 201 may comprise the host OS 221 (including e.g., the OS kernel as well as the packages of the host OS 221 including any associated libraries, binary and/or source files etc.), on which the application 116 may run. The base layer 202 may comprise the application itself including any packages and utilities necessary for the application 116 to run. Thus, base layers 201 and 202 may each comprise static snapshots of the container 114's configuration and may be read-only layers that are never modified. Any changes (e.g., data to be written by the application 116) may be implemented in subsequent (upper) layers such as in-memory layer 203. Changes made in the in-memory layer 203 may be saved by creating a new layered image.

Container images are generated by developers (or at least packagers) of an application who may have specialized knowledge of the minimal security requirements that a container executing the application will run with. Because users of an application cannot be relied on to ensure appropriate security settings, and container engines must be general purpose to allow as many different applications as possible to run, embodiments of the present disclosure enable a container engine to read and selectively apply custom security settings that are specified by a developer (or, e.g., a vendor) of an application within a container image corresponding to the application.

Figure 3A:
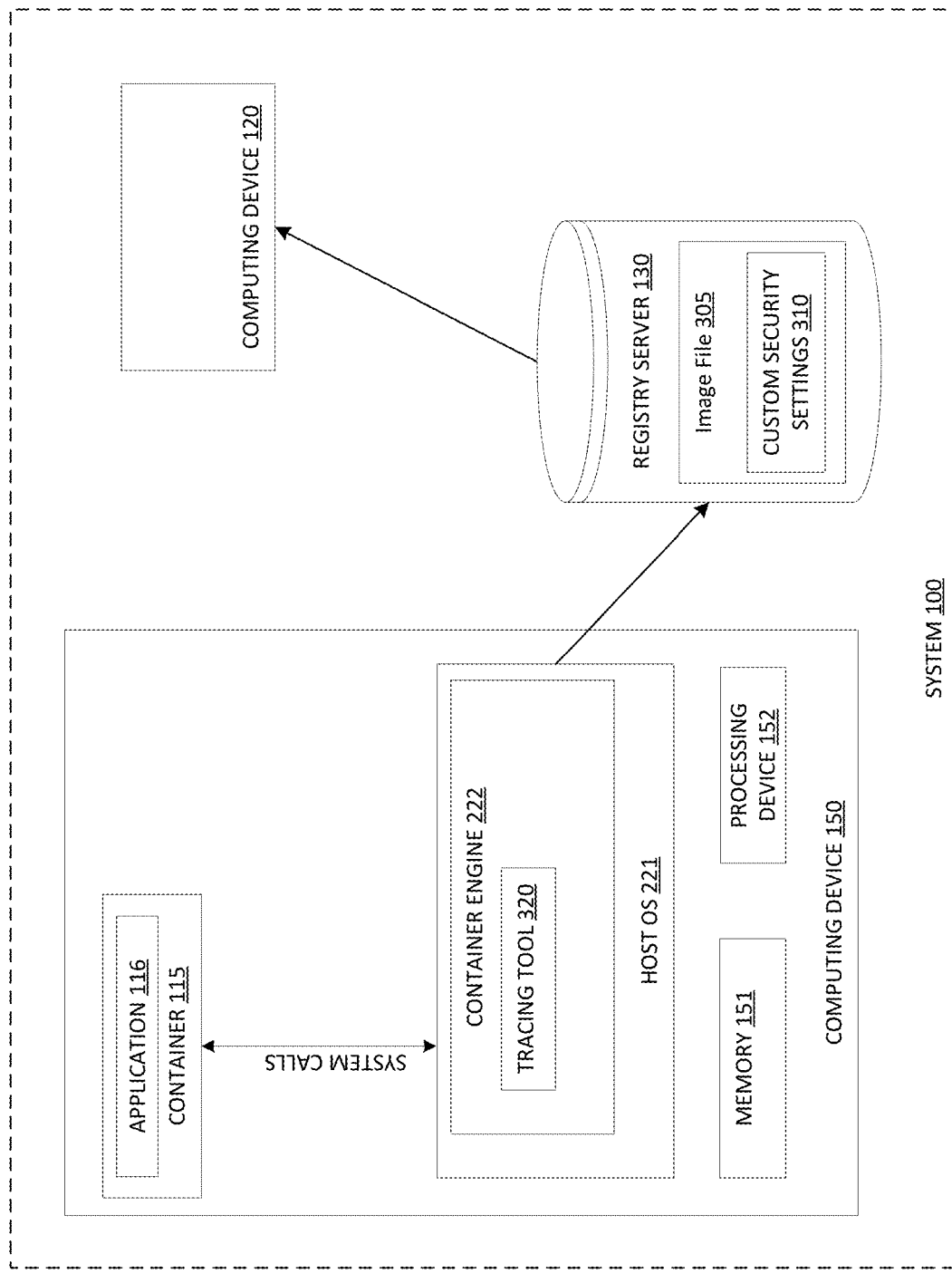
FIG. 3A is a block diagram that illustrates an example system, in accordance with some embodiments of the present disclosure.
Figure 3B:
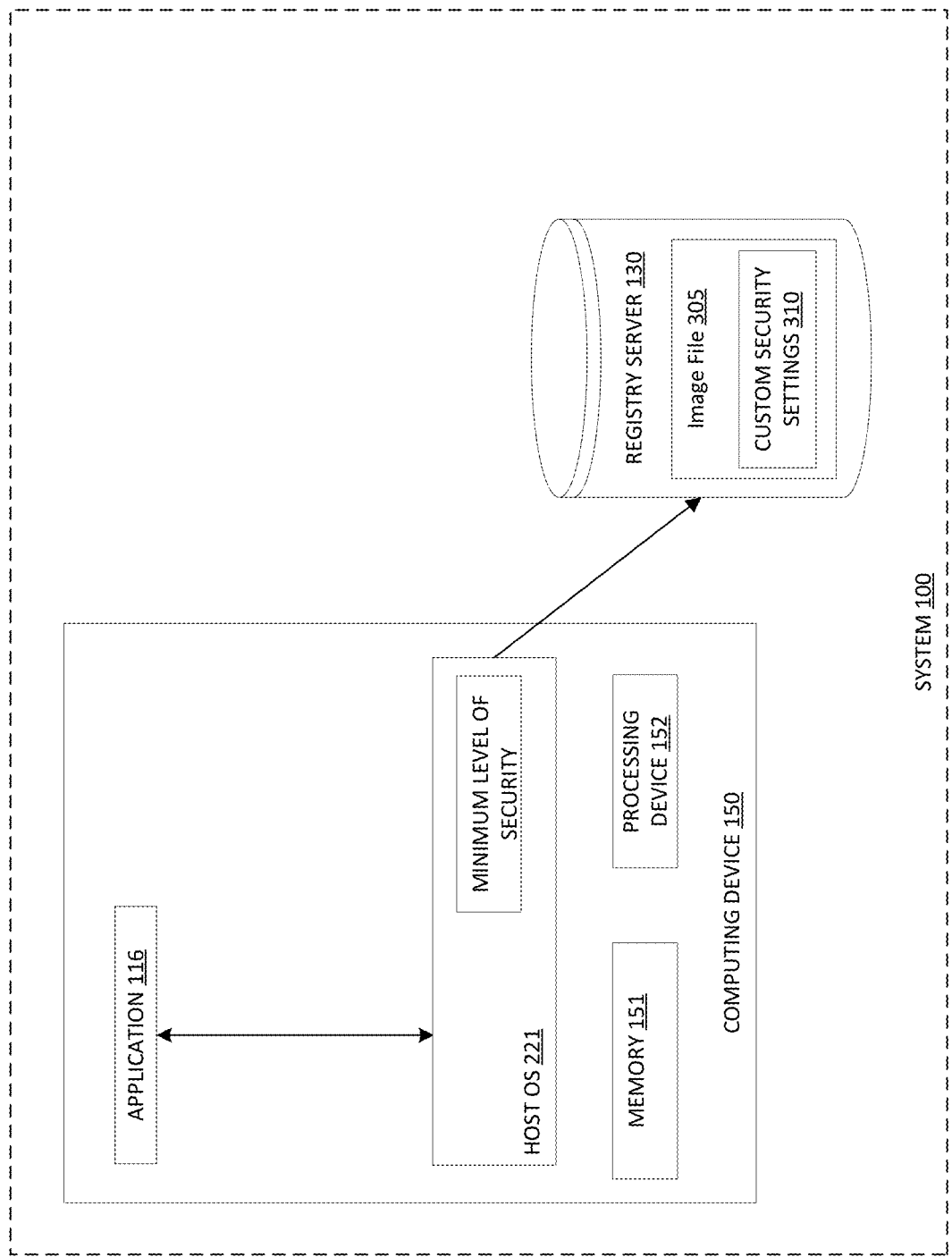
FIG. 3B is a block diagram that illustrates an example system, in accordance with some embodiments of the present disclosure.

FIGS. 3A and 3B illustrate system 100 in accordance with some embodiments of the present disclosure. As shown, system 100 may include computing device 150, which may be similar to computing device 120 and may represent a deployment of a developer of application 116. The developer may wish to generate custom security settings 310 for the application 116 based on the minimal amount of security required to run the application 116 and may analyze the application 116 to determine the minimal amount of security required. In some embodiments, the minimal amount of security required may correspond to only those system calls that are necessary for application 116 to operate. The container engine 222 may analyze the application 116 to determine those system calls that are necessary for application 116 to operate in order to generate a custom seccomp profile. Seccomp is a kernel feature that allows a user to filter system calls to the kernel from a container. The combination of restricted and allowed system calls may be arranged in seccomp profiles, and different seccomp profiles may be applied to different containers. Seccomp may provide a potential attacker access to a limited number of system calls from the container thereby reducing the potential attack surface. The default system calls that are available to a container may be included as part of a default seccomp profile and are an example of the default security settings 315 (illustrated in FIG. 3C). Seccomp may use any appropriate packet filter system, such as the Berkeley Packet Filter (BPF) system, which is programmable on an ad-hoc basis so that a user can define a custom seccomp profile. Thus, a developer of application 116 may determine a set of system calls that are necessary for operation of application 116 (as discussed in further detail herein), and define the custom security settings 310 as a custom seccomp profile indicating the set of determined necessary system calls as authorized and any other system calls as restricted.

The container engine 222 may utilize a special tool for determining system calls that are necessary. FIG. 3A illustrates system call tracing tool 320 (hereinafter referred to as "tracing tool 320") which the container engine 222 may use to determine which system calls are necessary for operation of the application 116. More specifically, the tracing tool 320 may trace the processes running inside the container 115 and create a custom seccomp profile based on the set of recorded system calls. The tracing tool 320 may comprise any appropriate packet filter program such as the extended Berkeley Packet Filter (eBPF) program, and may be implemented as an Open Container Initiative (OCI) runtime hook. OCI runtime hooks may be called at different stages of a container's lifecycle and executed by OCI-compliant container runtimes, such as runc. The tracing tool 320 may run at the pre-start stage, where the initialization process of the container 115 is created but not yet started. The tracing tool 320 may extract the PID namespace of the container 115, compile the eBPF program, and begin tracing system calls. These operations may occur before the container 115 is started, so as to avoid losing any of the container 115's early system calls. Once the eBPF program is running, container engine 222 may detach it from the OCI runtime hook, and the container may start the container 115.

The tracing tool 320 may output the custom security settings 310 in the form of a custom seccomp profile (the actual output may be a json file or any appropriate file type) indicating only the system calls that are necessary for the application 116 to run. As discussed in further detail herein, container tools such as Podman and Docker may parse and compile the custom seccomp profile into a seccomp filter which may be applied to a container.

In some embodiments, the minimal amount of security required may correspond to the minimum privileges that are necessary for application 116 to operate. Thus, container engine 222 may analyze application 116 to determine the privileges that are necessary for the application 116 to operate (as discussed in further detail herein), and generate the custom security settings 310 as a custom set of privileges including only those privileges necessary for the application 116 to operate. The custom set of privileges may be used with the Linux capabilities feature which breaks up the privileges available to processes that run as the root user into smaller groups of privileges. In this way, a process running with root privilege can be restricted to only the privileges it needs to operate. More specifically, the container engine 222 may start a container with a default set of privileges (which are an example of the default security settings 315), and privileges within this default set may be manually removed/ restricted, while other privileges may also be added manually. In this way a process running with root privilege can be limited to utilising only privileges it is authorized to use (e.g., the minimal privileges it needs to operate). The container engine 222 may utilize any appropriate capability tracing tool for tracing which privileges are necessary for a given application to operate.

As discussed herein, the container engine 222 may include any appropriate tools for building, managing and running containers and container images such as Podman or Docker. Container engine 222 may utilize e.g., Podman to build the container image 305 and embed the custom security settings 310 into the container image 305. For example, the container engine 222 may generate one or more labels comprising the custom security settings 310, and embed labels into container image 305.

Labels may comprise a set of key/value pairs that are attached to a container image or a container and are not visible to the application running therein. A label may be used to select objects and to find collections of objects that satisfy certain conditions. Labels can be used to provide identifying metadata for the entire Kubernetes hierarchy including pods, services, deployment/replication controllers, and namespaces. Label keys may comprise two segments: an optional prefix and a name, separated by a slash (/).

Although described herein using labels, in some embodiments, one or more annotations comprising the custom security settings 310 may be generated and embedded into the container image 305. It should be noted that annotations may not be used to identify and select objects. The metadata in an annotation may be small or large, structured or unstructured, and may include characters not permitted by labels. Like labels, annotations may also comprise key/value pairs having annotation keys that comprise two segments: an optional prefix and name, separated by a slash (/).

Each layer of the container image 305 may include image metadata (e.g., in the form of a JSON file etc.) that defines application functionality and facilitates consumption of the image by container engine 222. The image metadata may describe application functionality, requirements, and resource consumption, among other information. In some embodiments, the container engine 222 may generate labels comprising the custom security settings 310 and embed these labels into the image metadata of the container image 305. In other embodiments, the container engine 222 may generate security content based on the custom security settings 310 and embed this security content into the container image 305 as a file system object. More specifically, a new layer may be created in the container image 305 in which a file system object including the security content may be stored.

The container engine 222 may then upload the container image 305 to the registry server 130. Although the above process of generating custom security settings 310 is described herein as being executed on a developer deployment (computing device 150), the process may also be executed on the same deployment where the custom security settings 310 are to be applied (e.g., computing device 120).

Figure 3C:
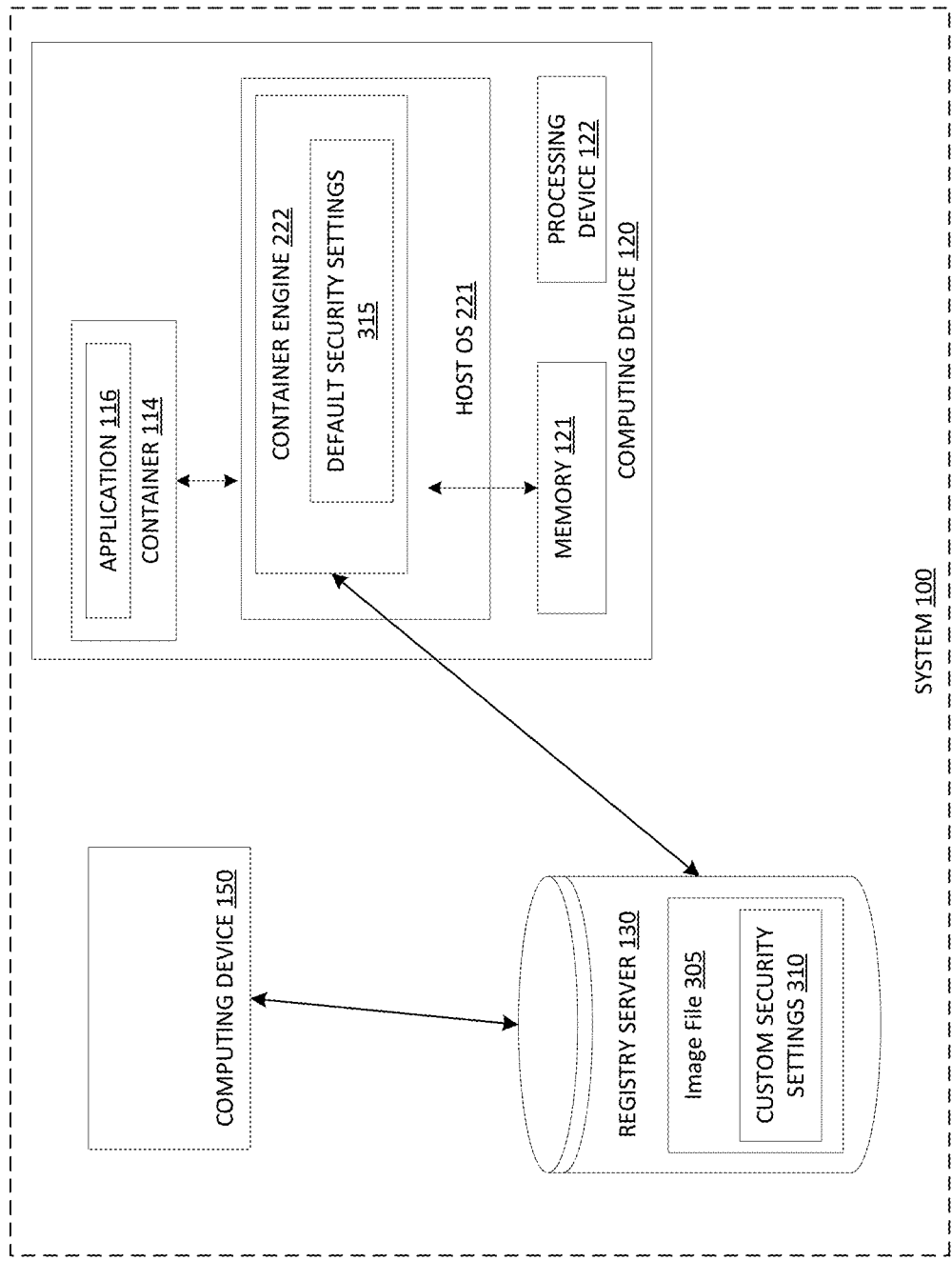
FIG. 3C is a block diagram that illustrates an example system, in accordance with some embodiments of the present disclosure.

FIG. 3C illustrates the system 100 in accordance with some embodiments of the present disclosure. A user of application 116 (e.g., on computing device 120—acting as a deployment of the user) may obtain the container image 305 from the registry server 130. The host OS 211 may provide tools for building, managing and running containers and container images in units referred to as pods. Examples of such tools may include Docker, or Podman, which may directly manage pods and container images (e.g., run, stop, start, attach, execute, etc.). Upon pulling container image 305 from registry server 130, container engine 222 may utilise Podman (or any other appropriate tool) to inspect the container image 305. More specifically, container engine 222 may inspect the image metadata of the container image 305 for the labels or annotations that comprise the custom security settings 310. In some embodiments, the container engine 222 may inspect the container image 305 for dedicated layers that include a file system object(s) in which the custom security settings 310 are included. Upon obtaining the custom security settings 310, the container engine 222 may utilize Podman to compare the custom security settings 310 to the default security settings 315. The container engine 222 may compare the custom and default security settings to determine if the custom security settings 310 are a subset of the default security settings 315. Stated differently, the container engine 222 may compare the custom and default security settings to determine if the custom security settings 310 are stricter than the default security settings 315. As discussed herein, the default security settings 315 may include a default set of privileges that the container 114 may utilize and/or a default seccomp profile indicating a default set of system calls that the container 114 may make.

Figure 4B:
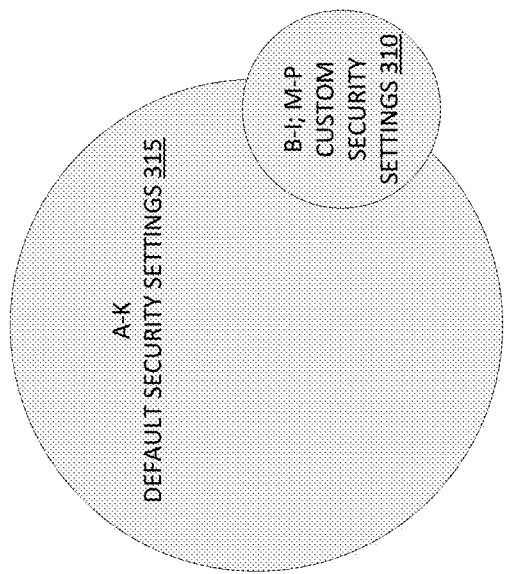
FIGS. 4A and 4B are diagrams illustrating different levels of overlap between custom security settings and default security settings, in accordance with some embodiments of the present disclosure.
Figure 4A:
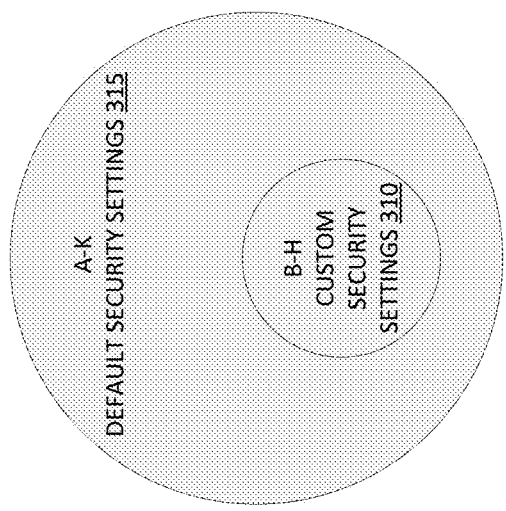

In some embodiments where the custom security settings 310 are generated as a custom set of privileges for use with Linux capabilities, the container engine 220 may determine if the custom set of privileges are a subset of the default set of privileges. Referring to the example of FIG. 4A, the default set of privileges may include privileges A-K, while the custom set of privileges may include privileges B-H. Container engine 220 may compare the default and custom sets of privileges and determine that the custom set of privileges are a subset of the default set of privileges (i.e., the custom security settings 310 are a subset of the default security settings 315 and are therefore more strict) since privileges B-H are a subset of privileges A-K. Upon making this determination, container engine 222 may use e.g., Podman to apply the custom security settings 310 to the container 114 and run the container 114. More specifically, the Linux capabilities tool may be used to modify the default set of privileges (default security settings 315) based on the custom set of privileges (custom security settings 310) so that the container 114 only runs with the custom set of privileges available. FIG. 4B illustrates another example, wherein the default set of privileges may include privileges A-K, while the custom set of privileges may include privileges B-I and M-P. Container engine 222 may compare the default and custom sets of privileges and determine that the custom set of privileges are not a subset of the default set of privileges (i.e., the custom security settings 310 are not a subset of the default security settings 315 and are therefore less strict) since privileges B-I are a subset of privileges A-K but privileges M-P are not. In some embodiments, upon making this determination, the container engine 222 may run the container 114 with the default security settings 315. In other embodiments, the container engine 222 may report the differences between the custom security settings 310 and the default security settings 315 to a user of the application 116, and query the user as to whether they would like to run the container 114 with the custom security settings 310 or the default security settings 315.

In some embodiments where the custom security settings 310 are generated as a custom seccomp profile, the container engine 222 may determine if the custom security settings 310 are a subset of the default security settings 315 by determining whether the set of system calls indicated by the custom seccomp profile are a subset of the default set of system calls. Container engine 222 may utilize the same process described above with respect to FIGS. 4A and 4B, in order to determine whether the set of system calls indicated by the custom seccomp profile are a subset of the default set of system calls. If the container engine 222 determines that the custom security settings 310 are a subset of (e.g., are stricter than) the default security settings 315, then it may run the container with the custom security settings 310 by applying the custom seccomp profile to the container 114. In this way, when application 116 is running on container 114 with custom security settings 310, it may utilize only the system calls that are determined necessary as indicated in the custom seccomp profile, as discussed in further detail herein.

If container engine 222 determines that the set of system calls indicated by the custom seccomp profile are a subset of the default set of system calls, then it may apply the custom seccomp profile to the container 114 when executing it. If container engine 222 determines that the set of system calls indicated by the custom seccomp profile are not a subset of the default set of system calls (i.e., the custom security settings 310 are not a subset of the default security settings 315 and are therefore less strict), then container engine 220 may run the container 114 with the default security settings 315. In some embodiments, upon determining that the set of system calls indicated by the custom seccomp profile are not a subset of the default set of system calls, container engine 220 may report the differences between the custom security settings 310 and the default security settings 315 to a user, and query the user as to whether they would like to run the container 114 with the custom security settings 310 or the default security settings 315.

Figure 5:
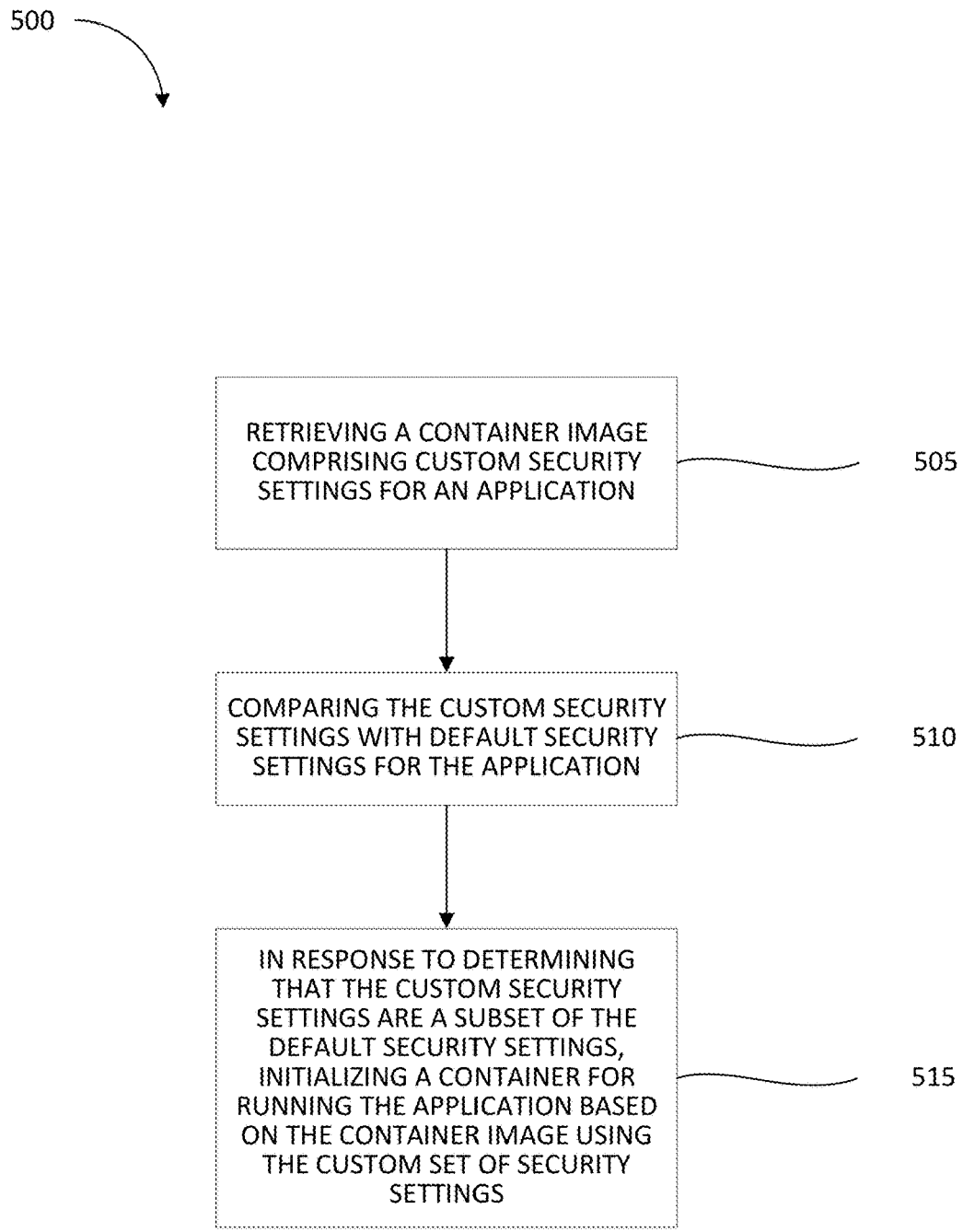
FIG. 5 is a flow diagram of a method of analyzing and determining whether to apply custom security settings, in accordance with some embodiments of the present disclosure.

FIG. 5 is a flow diagram of a method 500 for applying minimal security to a container, in accordance with some embodiments of the present disclosure. Method 500 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 500 may be performed by a computing device (e.g., computing device 120 illustrated in FIGS. 2A-3C).

Referring simultaneously to FIG. 3C as well, the method 500 begins at block 505, where the container engine 222 may retrieve the container image 305 from registry server 130, and utilize Podman (or any other appropriate tool) to inspect the container image 305. More specifically, container engine 222 may inspect the image metadata of the container image 305 for the labels or annotations that comprise the custom security settings 310 for a container on which application 116 is to run. In some embodiments, the container engine 222 may inspect the container image 305 for dedicated layers that include a file system object(s) in which the custom security settings 310 are included. Upon obtaining the custom security settings 310, at block 510 the container engine 222 may compare the custom security settings 310 to the default security settings 315. The container engine 222 may compare the custom and default security settings to determine if the custom security settings 310 are a subset of the default security settings 315. Stated differently, the container engine 220 may compare the custom and default security settings to determine if the custom security settings 310 are stricter than the default security settings 315. As discussed herein, the default security settings 315 may include a default set of privileges that the container 114 may utilize and/or a default seccomp profile indicating a default set of system calls that the container 114 may make.

At block 515, in response to determining that the custom security settings 310 are a subset of the default security settings 315, the container engine 222 may initialize a container 114 for running the application 116 based on the container image 305 and may apply the custom security settings 310. In some embodiments where the custom security settings 310 are generated as a custom set of privileges for use with Linux capabilities, the container engine 222 may determine if the custom set of privileges are a subset of the default set of privileges. Referring to the example of FIG. 4A, the default set of privileges may include privileges A-K, while the custom set of privileges may include privileges B-H. Container engine 220 may compare the default and custom sets of privileges and determine that the custom set of privileges are a subset of the default set of privileges (i.e., the custom security settings 310 are a subset of the default security settings 315 and are therefore more strict) since privileges B-H are a subset of privileges A-K. Upon making this determination, container engine 220 may use Podman to apply the custom security settings 310 to the container 114 and run the container 114. More specifically, the Linux capabilities tool may be used to modify the default set of privileges based on the custom set of privileges so that the application 116 only runs with the custom set of privileges available. FIG. 4B illustrates another example, wherein the default set of privileges may include privileges A-K, while the custom set of privileges may include privileges B-I and M-P. Container engine 220 may compare the default and custom sets of privileges and determine that the custom set of privileges are not a subset of the default set of privileges (i.e., the custom security settings 310 are not a subset of the default security settings 315 and are therefore less strict) since privileges B-H are a subset of privileges A-K but privileges M-P are not. In some embodiments, upon making this determination, container engine 220 may run the container 114 with the default security settings 315. In other embodiments, container engine 220 may report the differences between the custom security settings 310 and the default security settings 315 to a user, and query the user as to whether they would like to run the container 114 with the custom security settings 310 or the default security settings 315.

In some embodiments where the custom security settings 310 are generated as a custom seccomp profile, the container engine 222 may determine if the custom security settings 310 are a subset of the default security settings 315 by determining whether the set of system calls indicated by the custom seccomp profile are a subset of the default set of system calls. Container engine 222 may utilize the same process described above with respect to FIGS. 4A and 4B, in order to determine whether the set of system calls indicated by the custom seccomp profile are a subset of the default set of system calls. If the container engine 222 determines that the custom security settings 310 are a subset of (e.g., are stricter than) the default security settings 315, then it may run the container 114 with the custom security settings 310 by applying the custom seccomp profile to the container 114. In this way, when application 116 is running on container 114 with custom security settings 310, it may utilize only the system calls that are determined necessary as indicated in the custom seccomp profile, as discussed in further detail herein.

Figure 6:
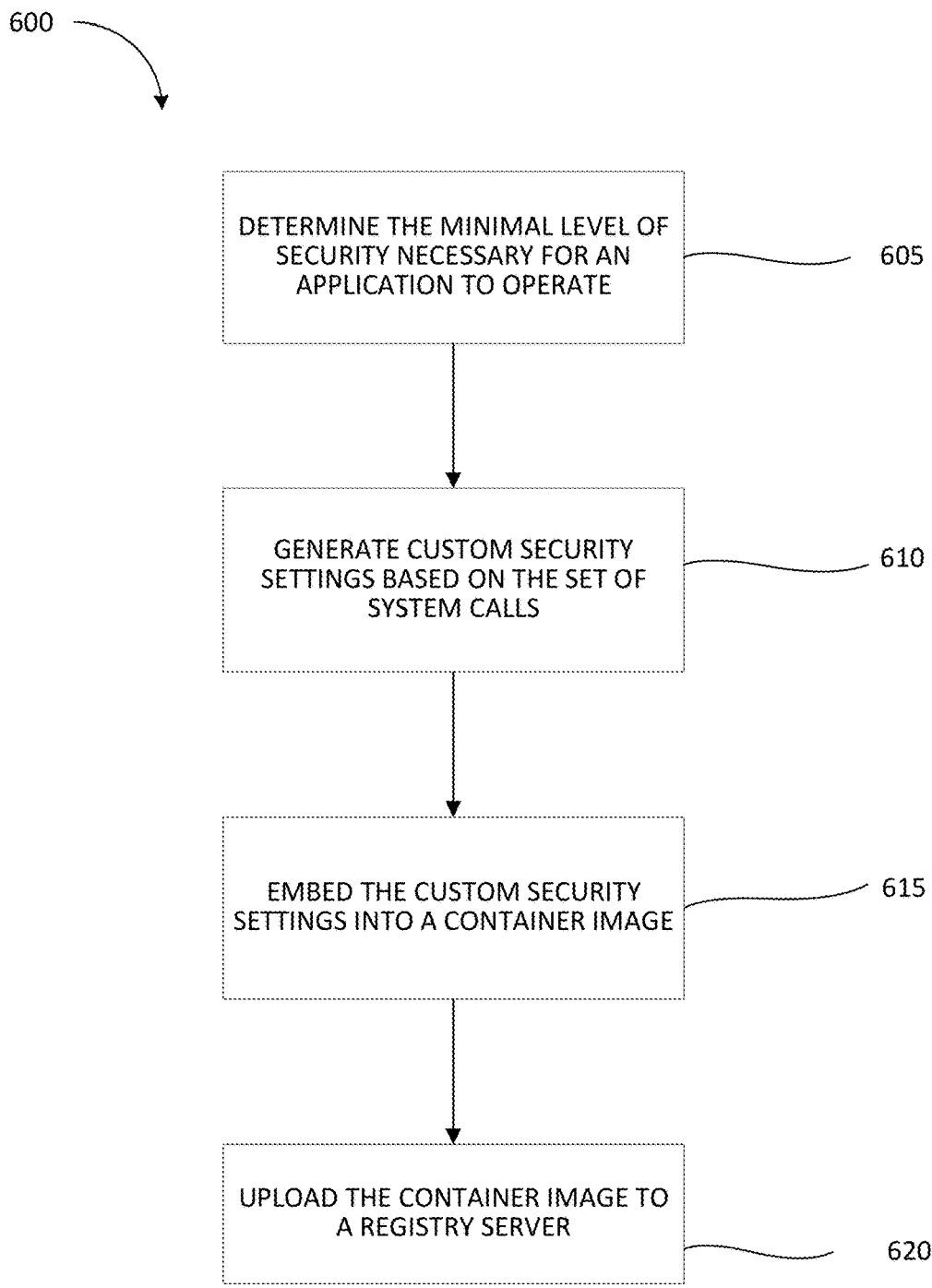
FIG. 6 is a flow diagram of a method of determining custom security requirements for an application, in accordance with some embodiments of the present disclosure.

FIG. 6 is a flow diagram of a method 600 of generating custom security settings, in accordance with some embodiments of the present disclosure. Method 600 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 600 may be performed by a computing device (e.g., computing device 150 illustrated in FIGS. 3A and 3B).

At block 605, the developer (or e.g., vendor) of application 116 may wish to generate custom security settings 310 for the application 116 based on the minimal amount of security required to run the application 116 and may analyze the application 116 to determine the minimal level of security required. In some embodiments, the minimal amount of security required may correspond to only those system calls that are necessary for application 116 to operate. The container engine 222 may analyze the application 116 to determine those system calls that are necessary for application 116 to operate (as discussed with respect to FIG. 3A) in order to generate a custom seccomp profile. Seccomp is a kernel feature that allows a user to filter system calls to the kernel from a container. The combination of restricted and allowed system calls may be arranged in seccomp profiles, and different seccomp profiles may be applied to different containers. Seccomp may provide a potential attacker access to a limited number of system calls from the container thereby reducing the potential attack surface. The default system calls that are available to a container may be included as part of a default seccomp profile and are an example of the default security settings 315 (illustrated in FIG. 3C). Seccomp may use any appropriate packet filter system, such as the Berkeley Packet Filter (BPF) system, which is programmable on an ad-hoc basis so that a user can define a custom seccomp profile. Thus, a developer of application 116 may determine a set of system calls that are necessary for operation of application 116 (as discussed in further detail herein).

In some embodiments, the minimal level of security required to run the application 116 may correspond to the minimum privileges that are necessary for application 116 to operate. The Linux capabilities feature breaks up the privileges available to processes that run as the root user into smaller groups of privileges. In this way, a process running with root privilege can be restricted to only the privileges it needs to operate. More specifically, the container engine 222 may ordinarily start a container with a default set of privileges (which are an example of the default security settings 315), and privileges within this default set may be manually removed/restricted, while other privileges may also be added manually. In this way a process running with root privilege can be limited to utilising only privileges it is authorized to use (e.g., the minimal privileges it needs to operate). Thus, container engine 222 may analyze application 116 to determine the minimum privileges that are necessary for the application 116 to operate (as discussed in further detail herein).

At block 610 container engine 222 may generate the custom security settings 310 as a custom seccomp profile indicating the set of determined necessary system calls as authorized and any other system calls as restricted (in embodiments where the minimal amount of security required corresponds to only those system calls that are necessary for application 116 to operate). Alternatively, the container engine 222 may generate the custom security settings 310 as a custom set of privileges including only those privileges necessary for the application 116 to operate (in embodiments where the minimal amount of security required corresponds to those privileges that are necessary for application 116 to operate). The container engine 222 may utilize any appropriate capability tracing tool to trace which privileges are necessary for application 116 to operate.

As discussed herein, the container engine 222 may include any appropriate tools for building, managing and running containers and container images such as Podman or Docker. At block 615, the container engine 222 may utilize e.g., Podman to build the container image 305 and embed the custom security settings 310 into the container image 305. For example, the container engine 222 may generate one or more labels comprising the custom security settings 310, and these labels may be embedded into container image 305.

Labels may comprise a set of key/value pairs that are attached to a container image or a container and are not visible to the running application. A label may be used to select objects and to find collections of objects that satisfy certain conditions. Labels can be used to provide identifying metadata for the entire Kubernetes hierarchy including pods, services, deployment/replication controllers, and namespaces. Label keys may comprise two segments: an optional prefix and a name, separated by a slash (/).

Although described using labels, in some embodiments, one or more annotations may be generated comprising the custom security settings 310 and embedded into the container image 305. It should be noted that annotations may not be used to identify and select objects. The metadata in an annotation may be small or large, structured or unstructured, and may include characters not permitted by labels. Like labels, annotations may also comprise key/value pairs having annotation keys that comprise two segments: an optional prefix and name, separated by a slash (/).

Each layer of the container image 305 may include image metadata (e.g., in the form of a JSON file etc.) that defines application functionality and facilitates consumption of the image by container engine 222. The image metadata may describe application functionality, requirements, and resource consumption, among other information. In some embodiments, the container engine 222 may generate labels comprising the custom security settings 310 and embed these labels into the image metadata of the container image 305. In other embodiments, the container engine 222 may generate security content based on the custom security settings 310 and embed this security content into the container image 305 as a file system object. More specifically, a new layer may be created in the container image 305 in which a file system object including the security content may be stored. The labels indicating the custom security settings 310 may be embedded into the container image 305 in this way in situations where e.g., there is insufficient space in the image metadata.

At block 620, the container engine 222 may then upload the container image 305 to the registry server 130. Although the above process of generating custom security settings 310 is described herein as being executed on a vendor deployment (computing device 150), the process may also be executed on the same deployment where the custom security settings 310 may be applied (e.g., computing device 120).

Figure 7:
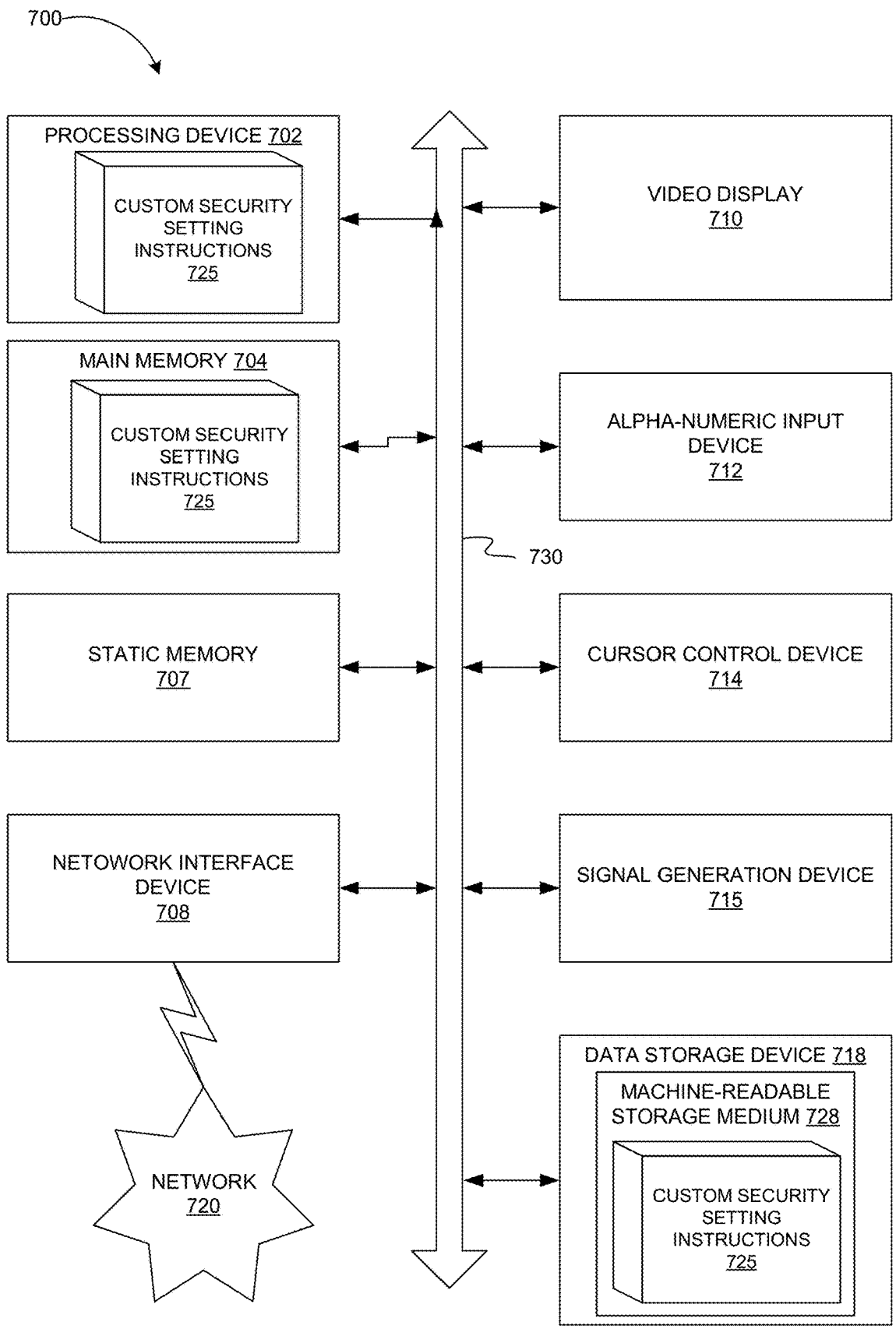
FIG. 7 is a block diagram of an example computing device that may perform one or more of the operations described herein, in accordance with some embodiments of the present disclosure.

FIG. 7 illustrates a diagrammatic representation of a machine in the example form of a computer system 700 within which a set of instructions, for causing the machine to perform any one or more of the methodologies discussed herein for containerizing the packages of an operating system. More specifically, the machine may determine a dependency level of each of a plurality of packages included in an operating system, sort the plurality of packages based on their dependency level, create an image file for each of the plurality of packages sequentially, based on the dependency level of each of the plurality of packages, upload the image file for each of the plurality of packages to a repository, and in response to a request to generate a container on which to run an application, generate the container using one or more of the plurality of image files, wherein the one or more of the plurality of image files correspond to one or more of the plurality of packages that the application is dependent on.

In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 700 may be representative of a server.

The exemplary computer system 700 includes a processing device 702, a main memory 704 (e.g., read-only memory (ROM), flash memory, dynamic random access memory (DRAM), a static memory 706 (e.g., flash memory, static random access memory (SRAM), etc.), and a data storage device 718, which communicate with each other via a bus 730. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Computing device 700 may further include a network interface device 708 which may communicate with a network 720. The computing device 700 also may include a video display unit 710 (e.g., a liquid crystal display (LCD) or a cathode ray tube (CRT)), an alphanumeric input device 712 (e.g., a keyboard), a cursor control device 714 (e.g., a mouse) and an acoustic signal generation device 716 (e.g., a speaker). In one embodiment, video display unit 710, alphanumeric input device 712, and cursor control device 714 may be combined into a single component or device (e.g., an LCD touch screen).

Processing device 702 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute custom security setting instructions 725, for performing the operations and steps discussed herein.

The data storage device 715 may include a machine-readable storage medium 728, on which is stored one or more sets of custom security setting instructions 725 (e.g., software) embodying any one or more of the methodologies of functions described herein. The custom security setting instructions 725 may also reside, completely or at least partially, within the main memory 704 or within the processing device 702 during execution thereof by the computer system 700; the main memory 704 and the processing device 702 also constituting machine-readable storage media. The custom security setting instructions 725 may further be transmitted or received over a network 620 via the network interface device 725.

The machine-readable storage medium 728 may also be used to store instructions to perform a method for object analysis/validation event publishing, as described herein. While the machine-readable storage medium 728 is shown in an exemplary embodiment to be a single medium, the term "machine-readable storage medium" should be taken to include a single medium or multiple media (e.g., a centralized or distributed database, and/or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Example 1 is a method comprising: retrieving a container image comprising custom security settings for an application; comparing the custom security settings with default security settings for the application, and in response to determining that the custom security settings are a subset of the default security settings, initializing, by a processing device, a container for running the application based on the container image using the custom set of security settings.

Example 2 is the method of example 1, further comprising: in response to determining that the custom security settings are not a subset of the default security settings, reporting a difference between the custom security settings and the default security settings to a user.

Example 3 is the example of claim 1, wherein the default security settings comprise a default seccomp profile indicating a default set of system calls that the application may run and the custom security settings comprise a custom seccomp profile indicating a custom set of system calls that the application may run.

Example 4 is the method of example 3, wherein determining that the custom security settings are a subset of the default security settings comprises: determining that the set of system calls are a subset of the default set of system calls.

Example 5 is the method of example 1, wherein the default security settings comprise a default set of privileges available to the application and the custom security settings comprise a custom set of privileges available to the application.

Example 6 is the method of example 5, wherein determining that the custom security settings are a subset of the default security settings comprises: determining that the custom set of privileges are a subset of the default set of privileges.

Example 7 is the method of example 1, wherein the custom security settings comprise labels embedded within the container image.

Example 8 is a system comprising: a memory; and a processing device operatively coupled to the memory, the processing device to: retrieve a container image comprising custom security settings for an application; comparing the custom security settings with default security settings for the application, and in response to determining that the custom security settings are a subset of the default security settings, initialize a container for running the application based on the container image using the custom set of security settings.

Example 9 is the system of example 8, wherein the processing device is further to: in response to determining that the custom security settings are not a subset of the default security settings, report a difference between the custom security settings and the default security settings to a user.

Example 10 is the system of example 8, wherein the default security settings comprise a default seccomp profile indicating a default set of system calls that the application may run and the custom security settings comprise a custom seccomp profile indicating a custom set of system calls that the application may run.

Example 11 is the system of example 10, wherein to determine that the custom security settings are a subset of the default security settings, the processing device is to: determine that the set of system calls are a subset of the default set of system calls.

Example 12 is the system of example 8, wherein the default security settings comprise a default set of privileges available to the application and the custom security settings comprise a custom set of privileges available to the application.

Example 13 is the system of example 12, wherein to determine that the custom security settings are a subset of the default security settings, the processing device is to: determine that the custom set of privileges are a subset of the default set of privileges.

Example 14 is the system of example 8, wherein the custom security settings comprise labels embedded within the container image.

Example 15 is a system comprising: a memory; and a processing device operatively coupled to the memory, the processing device to: determine a minimum level of security that is necessary for an application to operate, generate custom security settings based on the minimum level of security, and embed the custom security settings into a container image corresponding to the application.

Example 16 is the system of example 15, wherein to generate the custom security settings, the processing device is to: define the custom security settings using one or more labels.

Example 17 is the system of example 15, wherein to embed the custom security settings into the container image, the processing device is to: include the custom security settings as part of image metadata of the container image.

Example 18 is the system of example 15, wherein to embed the custom security settings into the container image, the processing device is to: include the custom security settings into a layer of the container image as a file system object.

Example 19 is the system of example 15, wherein to determine the minimum level of security that is necessary for the application to operate, the processing device is to: trace system calls made by the application during a pre-start phase of a container in which the application is running, wherein during the pre-start phase an initialization process of the container is created but not yet started, and determine a set of system calls that is necessary for the application to operate based on the traced system calls made by the application.

Example 20 is the system of example 15, wherein the custom security settings comprise a custom seccomp profile indicating the set of system calls that is necessary for the application to operate.

Example 21 is the system of example 15, wherein the custom security settings comprise a custom set of privileges indicating privileges that are necessary for the application to operate.

Example 22 is a non-transitory computer-readable medium having instructions stored thereon which, when executed by a processing device, cause the processing device to: determine a minimum level of security that is necessary for an application to operate, generate custom security settings based on the minimum level of security, and embed, by the processing device, the custom security settings into a container image corresponding to the application.

Example 23 is the non-transitory computer-readable medium of example 22, wherein to generate the custom security settings, the processing device is to: define the custom security settings using one or more labels.

Example 24 is the non-transitory computer-readable medium of example 22, wherein to embed the custom security settings into the container image, the processing device is to: include the custom security settings as part of image metadata of the container image.

Example 25 is the non-transitory computer-readable medium of claim 15, wherein to embed the custom security settings into the container image, the processing device is to: include the custom security settings into a layer of the container image as a file system object.

Example 26 is the non-transitory computer-readable medium of claim 15, wherein to determine the minimum level of security that is necessary for the application to operate, the processing device is to: trace system calls made by the application during a pre-start phase of a container in which the application is running, wherein during the pre-start phase an initialization process of the container is created but not yet started, and determine a set of system calls that is necessary for the application to operate based on the traced system calls made by the application.

Example 27 is the non-transitory computer-readable medium of claim 15, wherein the custom security settings comprise a custom seccomp profile indicating the set of system calls that is necessary for the application to operate.

Example 28 is an apparatus comprising: means for retrieving a container image comprising custom security settings for an application; comparing the custom security settings with default security settings for the application, and means for, in response to determining that the custom security settings are a subset of the default security settings, initializing, by a processing device, a container for running the application based on the container image using the custom set of security settings.

Example 29 is the apparatus of example 28, further comprising: means for, in response to determining that the custom security settings are not a subset of the default security settings, reporting a difference between the custom security settings and the default security settings to a user.

Example 30 is the apparatus of claim 28, wherein the default security settings comprise a default seccomp profile indicating a default set of system calls that the application may run and the custom security settings comprise a custom seccomp profile indicating a custom set of system calls that the application may run.

Example 31 is the apparatus of example 30, wherein the means for determining that the custom security settings are a subset of the default security settings comprises: means for determining that the set of system calls are a subset of the default set of system calls.

Example 32 is the apparatus of example 28, wherein the default security settings comprise a default set of privileges available to the application and the custom security settings comprise a custom set of privileges available to the application.

Example 33 is the apparatus of example 32, wherein the means for determining that the custom security settings are a subset of the default security settings comprises: means for determining that the custom set of privileges are a subset of the default set of privileges.

Example 34 is the apparatus of example 28, wherein the custom security settings comprise labels embedded within the container image.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

It will be appreciated that variants of the above-disclosed and other features and functions, or alternatives thereof, may be combined into may other different systems or applications. Various presently unforeseen or unanticipated alternatives, modifications, variations, or improvements therein may be subsequently made by those skilled in the art which are also intended to be encompassed by the following claims. The claims may encompass embodiments in hardware, software, or a combination thereof.

What is claimed is:

1. A system comprising:
 a memory; and
 a processing device operatively coupled to the memory, the processing device to:
  trace, using a trace tool, system calls made by an application to determine a set of system calls that are necessary for the application to operate, wherein the set of system calls that are necessary for the application to operate correspond to a minimum level of security for the application;
  define custom security settings based on the set of system calls that are necessary for the application to operate, wherein the custom security settings indicate the set of system calls that are necessary for the application to operate as authorized system calls for a system call filter; and
  embed the custom security settings into a container image corresponding to the application.

2. The system of claim 1, wherein the custom security settings comprise a custom seccomp profile.

3. The system of claim 1, wherein to embed the custom security settings into the container image, the processing device is to:
 include the custom security settings as part of image metadata of the container image.

4. The system of claim 1, wherein to embed the custom security settings into the container image, the processing device is to:
 include the custom security settings into a layer of the container image as a file system object.

5. The system of claim 1, wherein to trace the system calls made by the application, the processing device is to:

utilize the trace tool to trace the system calls made by the application during a pre-start phase of a container in which the application is running, wherein during the pre-start phase an initialization process of the container is created but not yet started.

6. The system of claim 5, wherein the processing device implements the trace tool as a run time hook.

7. The system of claim 1, further comprising:
compiling the custom security settings into the system call filter prior to embedding the custom security settings into the container image corresponding to the application.

8. A non-transitory computer-readable medium having instructions stored thereon which, when executed by a processing device, cause the processing device to:
trace, using a trace tool, system calls made by an application to determine a set of system calls that are necessary for the application to operate, wherein the set of system calls that are necessary for the application to operate correspond to a minimum level of security for the application;
define custom security settings based on the set of system calls that are necessary for the application to operate, wherein the custom security settings indicate the set of system calls that are necessary for the application to operate as authorized system calls for a system call filter; and
embed, by the processing device, the custom security settings into a container image corresponding to the application.

9. The non-transitory computer-readable medium of claim 8, wherein the custom security settings comprise a custom seccomp profile.

10. The non-transitory computer-readable medium of claim 8, wherein to embed the custom security settings into the container image, the processing device is to:
include the custom security settings as part of image metadata of the container image.

11. The non-transitory computer-readable medium of claim 8, wherein to embed the custom security settings into the container image, the processing device is to:
include the custom security settings into a layer of the container image as a file system object.

12. The non-transitory computer-readable medium of claim 8, wherein to trace the system calls made by the application, the processing device is to:
utilize the trace tool to trace the system calls made by the application during a pre-start phase of a container in which the application is running, wherein during the pre-start phase an initialization process of the container is created but not yet started.

13. The non-transitory computer-readable medium of claim 8, wherein the processing device implements the trace tool as a run time hook.

14. A method comprising:
tracing, using a tracing tool, system calls used by an application to determine a set of system calls that are necessary for the application to operate, wherein the set of system calls that are necessary for the application to operate correspond to a minimum level of security for the application;
defining custom security settings based on the set of system calls that are necessary for the application to operate; and
embedding the custom security settings into a container image corresponding to the application.

15. The method of claim 14, wherein defining the custom security settings comprises:
defining the custom security settings using one or more labels.

16. The method of claim 14, wherein embedding the custom security settings into the container image comprises:
including the custom security settings as part of image metadata of the container image.

17. The method of claim 14, wherein embedding the custom security settings into the container image comprises:
including the custom security settings into a layer of the container image as a file system object.

18. The method of claim 14, wherein tracing the system calls used by the application comprises:
utilizing the tracing tool to trace system calls used by the application during a pre-start phase of a container in which the application is running, wherein during the pre-start phase an initialization process of the container is created but not yet started.

19. The method of claim 15, wherein each of the one or more labels comprise a set of key/value pairs that are not visible to the application.

20. The method of claim 14, wherein a container building tool is used to embed the custom security settings into the container image corresponding to the application.

* * * * *